(12) United States Patent
Lertrattanapanich et al.

(10) Patent No.: US 8,295,551 B2
(45) Date of Patent: Oct. 23, 2012

(54) SYSTEM AND METHOD OF ADAPTIVE VERTICAL SEARCH RANGE TRACKING FOR MOTION ESTIMATION IN DIGITAL VIDEO

(75) Inventors: Surapong Lertrattanapanich, Irvine, CA (US); Yeong-Taeg Kim, Irvine, CA (US); Zhi Zhou, Irvine, CA (US)

(73) Assignee: Samsung Electronics Co., Ltd., Suwon (KR)

(*) Notice: Subject to any disclaimer, the term of this patent is extended or adjusted under 35 U.S.C. 154(b) by 868 days.

(21) Appl. No.: 12/420,749

(22) Filed: Apr. 8, 2009

(65) Prior Publication Data

US 2010/0260384 A1 Oct. 14, 2010

(51) Int. Cl.
*G06K 9/00* (2006.01)
(52) U.S. Cl. .................... 382/107; 375/240.16
(58) Field of Classification Search ............ 382/100, 382/107, 168; 375/240.16
See application file for complete search history.

(56) References Cited

U.S. PATENT DOCUMENTS

| | | | | |
|---|---|---|---|---|
| 6,078,618 A | * | 6/2000 | Yokoyama et al. | 375/240 |
| 6,278,736 B1 | | 8/2001 | De Haan et al. | |
| 6,782,054 B2 | | 8/2004 | Bellers | |
| 6,996,175 B1 | | 2/2006 | Olivieri | |
| 2007/0064803 A1 | | 3/2007 | Miao et al. | |
| 2009/0161763 A1 | * | 6/2009 | Rossignol et al. | 375/240.16 |

OTHER PUBLICATIONS

Toru Yamada et. al., "Fast and accurate motion estimation algorithm by adaptive search range and shape selection," ICASSP 2005, pp. II-897-II-900.
Hwang-Seok Oh et. al., "Adaptive adjustment of the search window for block-matching algorithm with variable block size," IEEE Trans. Consumer Electronics, vol. 44, No. 3, pp. 659-666, Aug. 1999.
G. A. Thomas, *Television motion measurement for DATV and other applications*, Tech. Rpt. 1987/11, BBC Research Dept., 1987.
G. de Haan et al., *Sub-pixel motion estimation with 3-d recursive search block matching*, Signal Processing: Image Communication, No. 6, pp. 229-239, 1994.
G. de Haan et al., *True-motion estimation with 3-d recursive search block matching*, IEEE Trans. DSVT, vol. 5, pp. 207-217, 1995.
G. de Haan et al., *An efficient true-motion estimator using candidate vectors from a parametric motion model*, IEEE Trans. CSVT, vol. 8, pp. 85-91, 1998.
G. de Haan, *Progress in motion estimation for consumer video format conversion*, IEEE Trans. Consumer Elec., vol. 46, No. 3, pp. 449-459, 2000.

* cited by examiner

*Primary Examiner* — Andrew W Johns
*Assistant Examiner* — Shefali Goradia

(57) ABSTRACT

A system and method which determines an adaptive vertical search range used to provide motion estimation in digital video content are disclosed. In some embodiments, a fixed-size vertical search range for the motion estimation is defined and utilized. A reference frame and target frame are stored in memory, and a block in the reference frame is selected for consideration. An offset value is determined which is indicative of a directional shift of the fixed-size vertical search range and the vertical search range is shifted based on the offset value. A motion vector is then estimated using the shifted vertical search range.

10 Claims, 16 Drawing Sheets

SYSTEM AND METHOD OF ADAPTIVE VERTICAL SEARCH RANGE TRACKING FOR MOTION ESTIMATION IN DIGITAL VIDEO

BACKGROUND OF THE INVENTION

1. Field of the Invention

This application relates to motion estimation in digital video. In particular, this application relates to systems and methods which determine an adaptive vertical search range used to provide motion estimation in digital video content.

2. Description of the Related Technology

In recent years, advancements in digital video processing have allowed video display manufacturers to produce systems which provide a more realistic viewing experience by enhancing raw digital video. Motion estimation algorithms are commonly used in providing enhanced video. For example, motion estimation algorithms are often utilized when performing de-interlacing of video, video format conversion, and frame rate conversion. Among the different types of motion estimation algorithms, block matching algorithms are often chosen for their superior trade-off between complexity (which is relatively low) and accuracy (which tends to be high). Block matching algorithms generally compare a given arbitrary block in one frame of video to one or more blocks from another frame of video in order to find a suitable matching block.

There are various different block matching algorithms which may be implemented to provide motion estimation. For example, full search algorithms, three-step search algorithms, four-step search algorithms, and recursive algorithms may all be used to provide motion estimation. Providing high quality block matching is often dependent on selecting an appropriate search range. A search range may be defined as a rectangular area having a horizontal search range and a vertical search range. For example, a search range may be defined as [−64,64] by [−16,16] to indicate that a motion vector may be obtained ranging from −64 to 64 units in the horizontal direction and −16 to 16 units in the vertical direction. In order to track a motion vector, the search range generally needs to be as large as the largest anticipated motion vector. Thus, larger motion vectors generally require larger search ranges. Increasing the size of a search range typically increases both the computational complexity and the hardware cost of the motion estimation process because there must typically be enough memory available to store all pixel values for the entire search range. Although various techniques to save computational complexity or hardware cost in motion estimation systems have been proposed, these techniques are not adequate.

SUMMARY OF CERTAIN INVENTIVE ASPECTS

The system, method, and devices of the present invention each have several aspects, no single one of which is solely responsible for its desirable attributes. Without limiting the scope of this invention, several of its features will now be discussed briefly.

A first inventive aspect is a method of providing motion estimation between video frames in a device is provided. The video frames comprising a reference frame and a target frame and the method includes defining a fixed-size vertical search range for the motion estimation and storing the reference frame and the target frame of video in at least one memory. A block is selected the reference frame for consideration and an offset value indicative of a directional shift of the fixed-size vertical search range is determined. The vertical search range is shifted based on the offset value and a motion vector is estimated based on data in the shifted vertical search range.

A second inventive aspect is a motion estimation system in a display device is provided. The motion estimation system may include a processor having a data storage and an adaptive vertical search range tracking (AVSRT) module configured to generate a vertical offset value for a vertical search range associated with a motion estimation cycle. The motion estimation system further includes a motion estimation module configured to receive the vertical offset value from the AVSRT module and estimate a motion vector for a reference frame and a target frame using a vertical search range indicative of the vertical offset value.

DETAILED DESCRIPTION OF CERTAIN INVENTIVE EMBODIMENTS

Various embodiments described herein relate to a system and method which allows a motion estimation system to track large panning motions without adding significant hardware cost. A fixed-size search range is used to determine a motion vector, but the location of the search range may be shifted by a predicted offset to allow the motion estimation module to estimate larger motion vectors without needing to allocate additional line memory to accommodate the larger motion vectors.

As noted above, conventional motion estimation systems may utilize block matching algorithms to estimate motion vectors in video processing. In order to reduce the computational complexity of the motion estimation, in some conventional systems a variable-sized search range is used which is modified from block to block depending on a prediction of the size of the motion vector. If the motion vector is predicted to be large, the search range is made larger. In contrast, if the motion vector is predicted to be small, the search range is reduced, thereby requiring fewer computations to estimate a motion vector. In order for the variable-sized search range to handle video sequences with large panning motions (e.g., where the camera moves quickly in a particular direction), the variable-sized search range must be large enough to track the large panning motion. Thus, although the variable-sized search range may reduce computational complexity in some instances, enough memory must be available to the motion estimation system to handle these large panning events, and hardware cost is not reduced.

In order to provide the benefit of reducing computational complexity, while at the same time reducing the hardware cost associated with motion estimation, an adaptive search range method is disclosed which utilizes a fixed-size search range that is shifted by a predicted offset to allow it to track large panning movements without needing additional line memory. Because the size of the search range is always the same, no additional memory is ever required to store the pixel values in the search range.

Most displays utilize horizontal line scanning in which an entire row of pixel values is loaded into memory and then the pixels are scanned from left to right in accordance with those values. Because the entire row is loaded into memory, the horizontal search range may be made larger without significantly impacting hardware requirements. The size of vertical search range, in contrast, is directly proportional to the number of necessary line memories and hardware cost. Thus, in some embodiments, the adaptive search range may be applied only to vertical search ranges, because the benefit of reduced hardware cost will be realized primarily in that context. However, a skilled artisan will appreciate that adaptive search range tracking as set forth herein may be used for both vertical and horizontal search range tracking.

Figure 1:
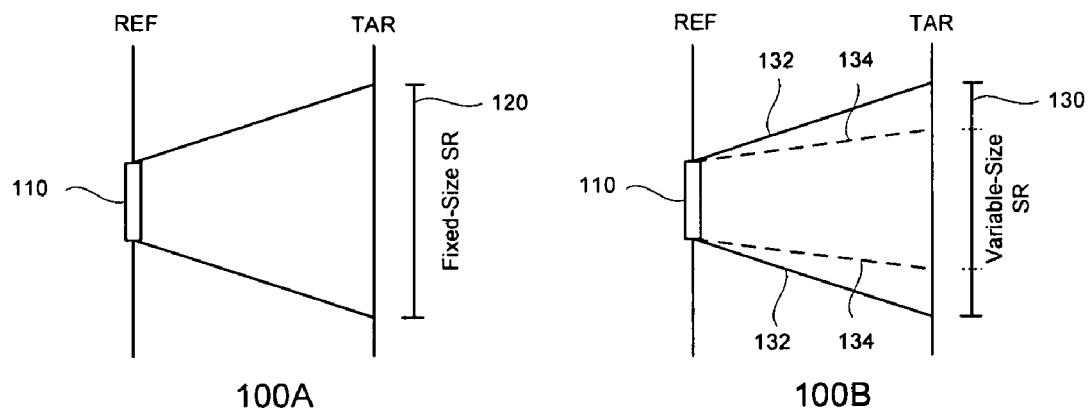
FIG. 1 provides examples of existing motion estimation applications which use a fixed-size search range and a variable-sized search range, respectively.

FIG. 1 provides an example of two types of conventional motion estimation. In the first example 100A, an illustration fixed-size vertical search range is provided. A reference (REF) frame and target (TAR) frame are provided from which a motion vector for the reference block 110 may be estimated by finding the best possible match within a fixed-size search range 120. In the second example 100B, a variable-size search range is shown. In the variable-size vertical search range, the search range is varied between solid lines 132 and dash lines 134 to reduce computational complexity. However, as shown, the total memory available remains the same as the fixed-size implementation and no hardware savings is realized.

Figure 2:
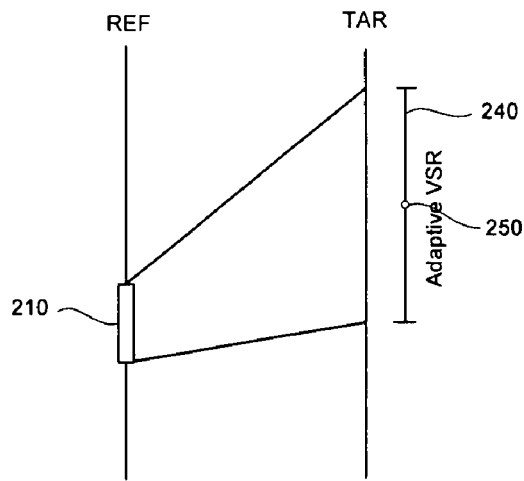
FIG. 2 is an example of an adaptive vertical search range in accordance with one or more embodiments.

FIG. 2 is an example of adaptive vertical search range implementation in accordance with one or more embodiments described herein. As shown, the center point 250 of the search range 240 may be shifted be a predicted offset to handle large panning movements or other types of non-standard motion estimation scenarios. As will be discussed in detail below, by predicting an offset value for the vertical search range, a motion estimation system may achieve better performance in cases of sudden and/or large panning movement without requiring additional hardware.

Figure 3:
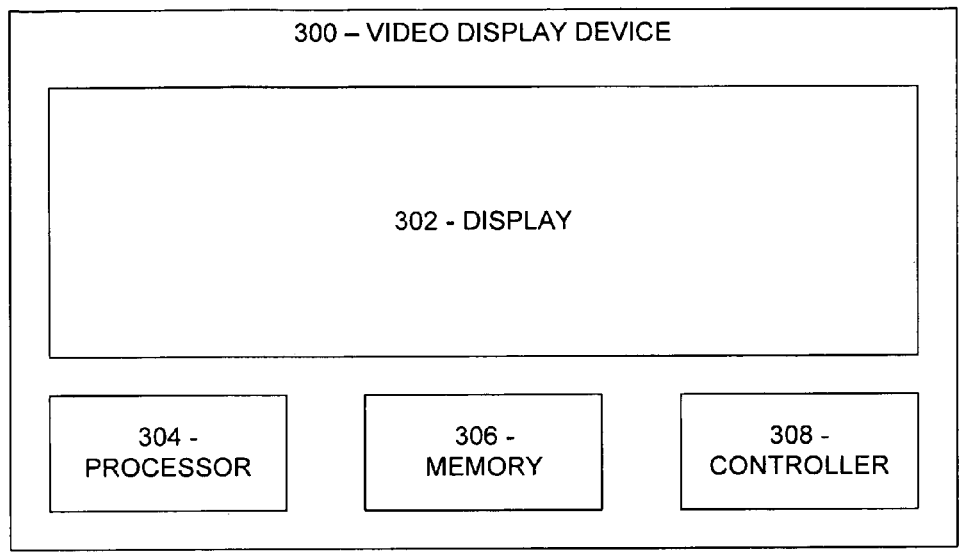
FIG. 3 is an example of a video display device suitable for implementation various embodiments disclosed herein.

Turning to FIG. 3, an example of a video display device suitable for implementation of adaptive search range tracking architecture is provided. The display device 300 may be a display incorporated into any one of various different types of audio/visual devices including a television, a computer monitor, a mobile telephone, a PDA, a handheld computer, or some other computing device with a graphic display made available to users. The display device 300 may also include additional complementary hardware such as a set-top box, a personal computer, a DVD player, or some other type of audio visual device.

The display device 300 may include various components including a display 302. The display 302 may be any of a number of different types of displays. In one embodiment, the display may be an LCD display. Alternatively, the display may be a plasma display, a CRT display, a DLP projector, or some other display type known in the art. The display device 300 also may include a processor 304. The processor 304 may be any of various types of processors. The processor 304 may be a central processing unit (CPU) with on board graphics capabilities. Other types of processors 304 may also be used. The display device 300 may further include a controller 308. The controller 308 generally receives raw image data from the processor 304 or some other internal device components. Once the data has been received, the controller 308 reformats the raw image data into a format suitable for scanning across the display 302 and sends the reformatted image data to the display 302. In some embodiments, the controller 308 may be associated with the processor 304 as a stand-alone Integrated Circuit (IC). However, the controller 308 may be implemented in various ways. For example, the controller may be embedded in the processor 304 as hardware, embedded in the processor 304 as software, or fully integrated in hardware with the display 302 itself.

Also included in the display device is a memory 306. The memory 306 may also take various forms. In one embodiment, the memory 306 may be dedicated on board chip memory that is included with one or both of the processor 304 and the controller 308. Alternatively, the memory 306 may be general purpose memory that is shared with other hardware and software included in the device. The memory 306 may be some form of random access memory (RAM) such as DRAM, SRAM, VRAM, SDRAM or the like, or it may some other form of memory such as flash memory, for example, which may be used to store data.

Although the illustrative display device 300 has been described with reference to a particular configuration in FIG. 3, a skilled artisan will readily appreciate that the display device 300 may take many forms and configurations. Moreover, the display device 300 may include various other system components not described herein which provide other features generally applicable to the device 300.

Figure 4A:
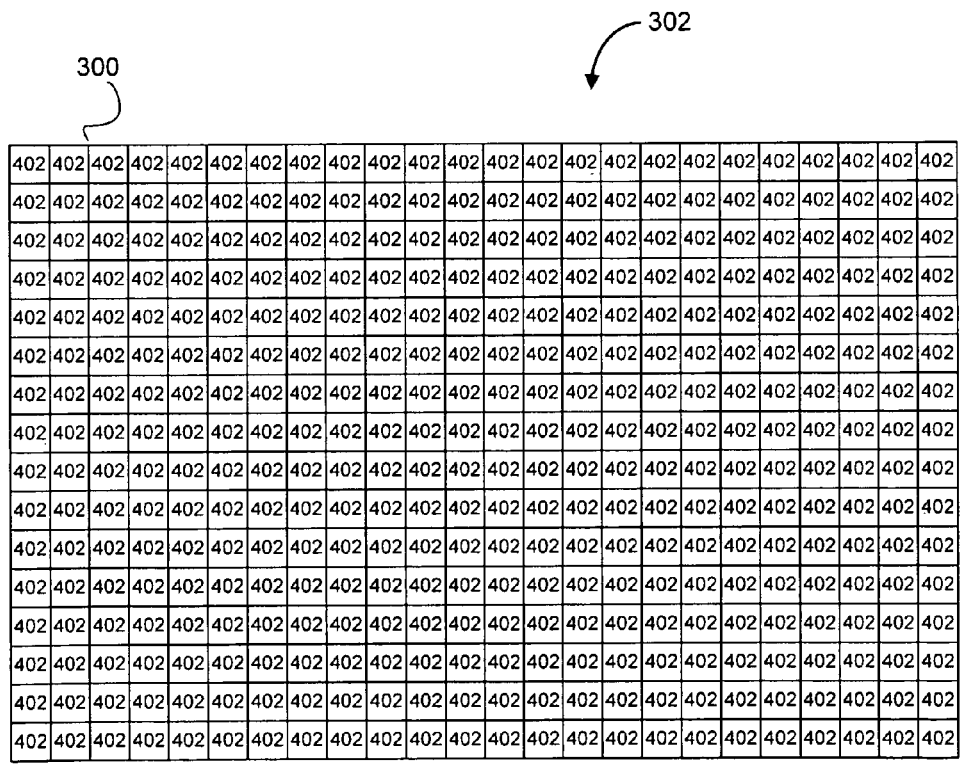
FIGS. 4A and 4B are examples of blocks and pixels, respectively.
Figure 4B:
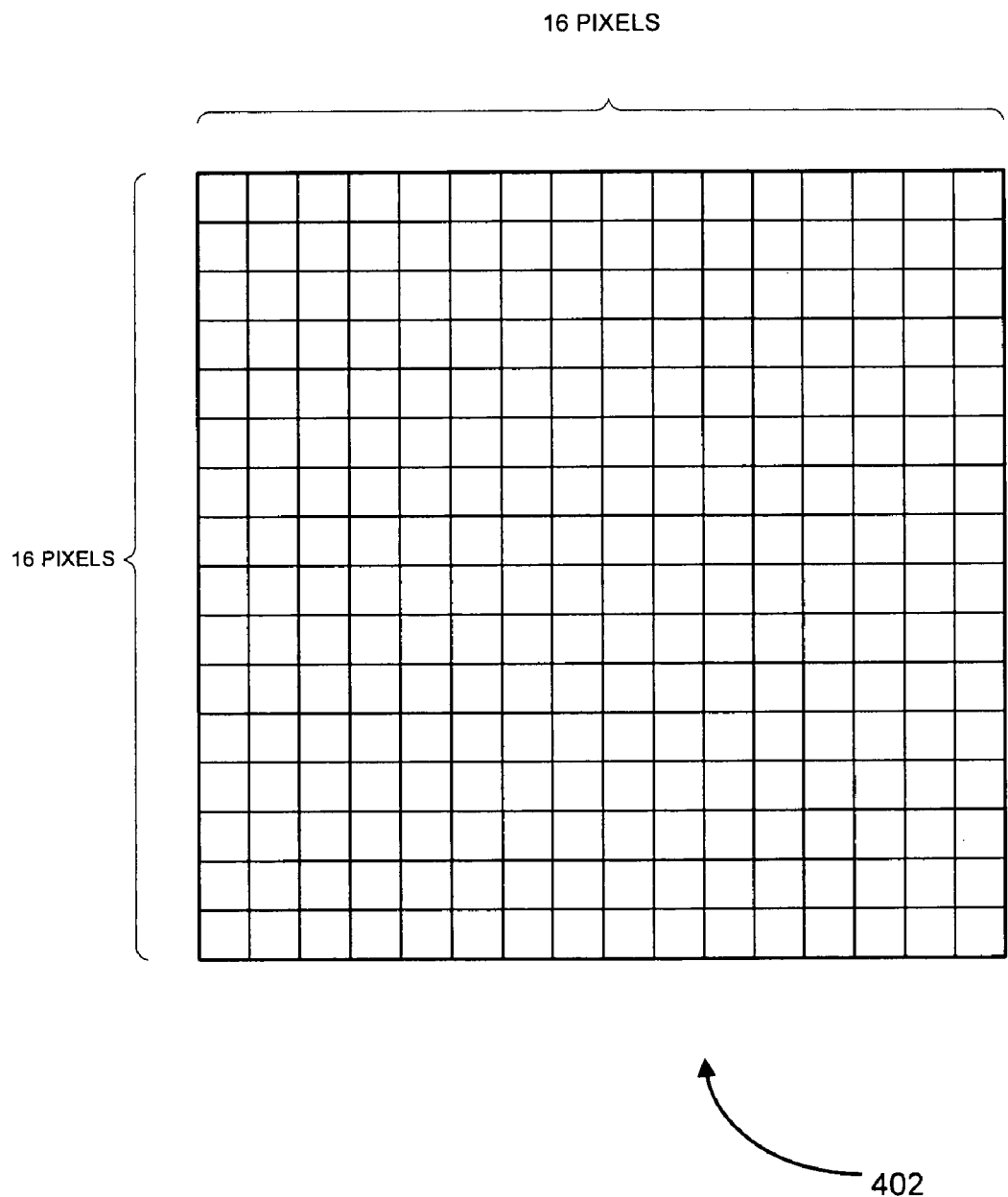

Referring now to FIG. 4A, an example of a frame 400 of the display 302 is provided. Video data is typically presented in the display device 300 as a series of video frames 400. Each frame 400 may be divided into an array of blocks 402. The blocks 402 are typically rectangular groups of pixels having a fixed size. For example, each frame in the display may be partitioned into 16 by 16 pixel blocks 402 as shown in FIG. 4B. Other block sizes and/or shapes may be used.

Figure 5:
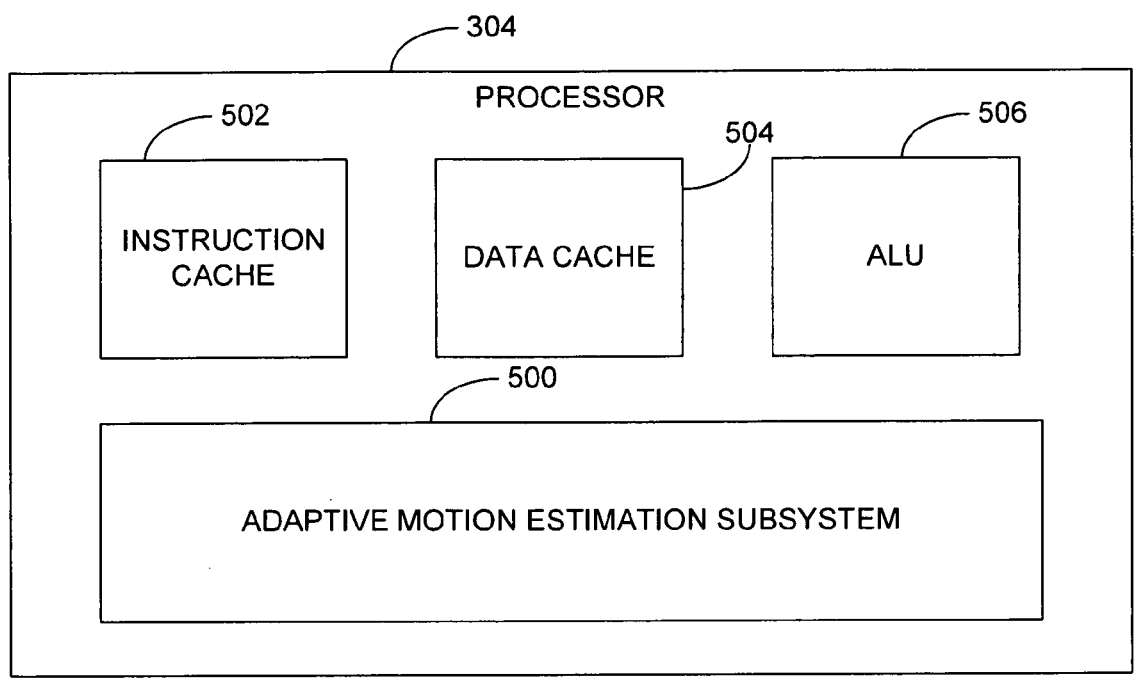
FIG. 5 is an example of a processor that may be configured to provide an adaptive vertical search range motion estimation system according to one or more embodiments.

Referring now to FIG. 5, a more detailed block diagram of the processor 504 is provided. As shown in the figure, the processor 504 may include an adaptive motion estimation subsystem 500. The adaptive motion estimation subsystem 500 typically takes the form of software and/or hardware which is configured to apply one or more motion estimation algorithms to an adaptive search range to yield a motion vector for the blocks in a frame, and is discussed in additional detail below with reference to FIGS. 6-9. The processor 104 may also include an instruction cache 502. The instruction cache 502 may be used to speed up executable instruction fetch as is known in the art. The data cache 504 may include memory storage which allows the processor to more efficiently retrieve and store data in memory. The processor 500 may also include an arithmetic logic unit (ALU) 506. The ALU 506 may be a digital circuit that performs arithmetic and logical operations. In some embodiments, the ALU 506 may be tasked with performing the necessary arithmetic operations to implement the motion estimation algorithms and the search range adaptations provided by the adaptive motion estimation subsystem 500.

Figure 6:
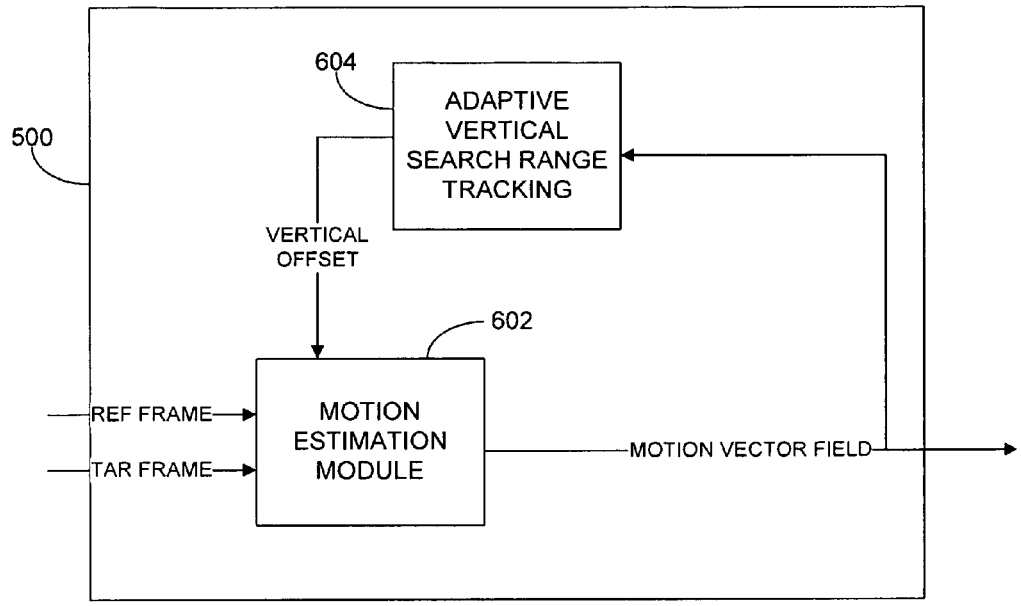
FIG. 6 is a more detailed view of the motion estimation subsystem from FIG. 5.

Turning now to FIG. 6, a more detailed view of an exemplary adaptive motion estimation subsystem 500 is provided. As shown, the motion estimation subsystem 500 includes a motion estimation module 602 which estimates one or more motion vectors. The motion estimation subsystem 500 also includes an adaptive vertical search range tracking module ("AVSRT") 604. The AVSRT 604 is used to predict the most probably vertical offset for the next cycle of motion estimation based on the currently defined motion vector. For each cycle of motion estimation, the motion estimation module 602 may receive an input reference frame, an input target frame, and a vertical offset value. The vertical offset, which is generated by the AVSRT 604, is sent back to the motion estimation module 602 and provides an indication that the search range should be adjusted vertically to have a greater likelihood of encompassing the correct motion vector field in the subsequent cycle.

Figure 7:
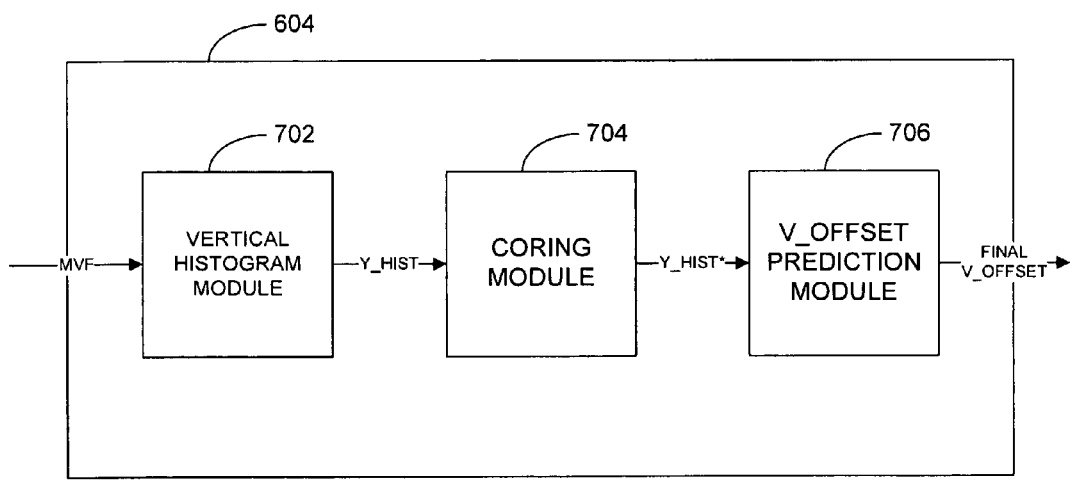
FIG. 7 is a more detailed view of the adaptive vertical search range tracking module from FIG. 6.
Figure 9A:
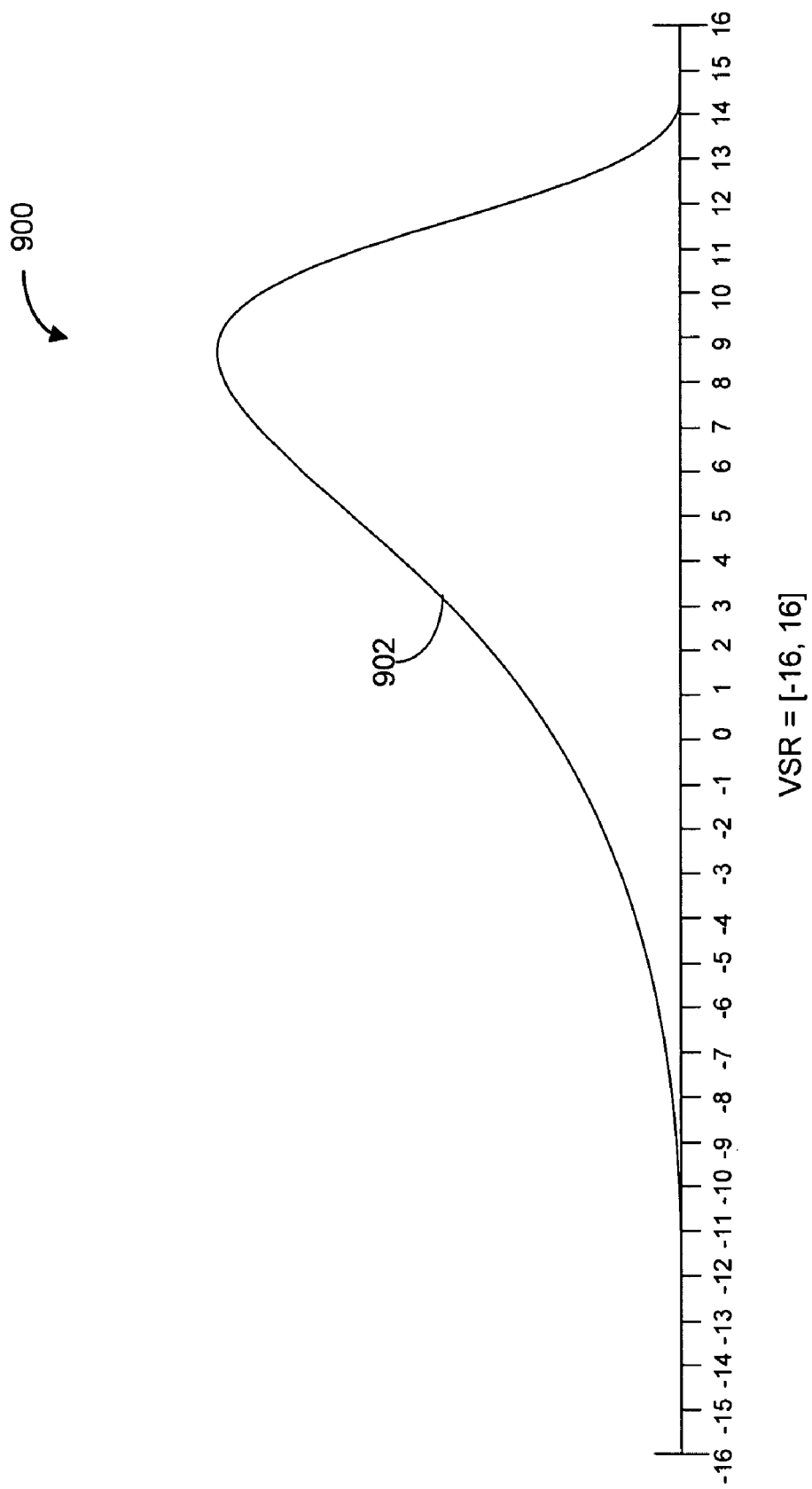
FIGS. 9A-9E provide examples of non-cored and cored histograms in accordance with one or more embodiments.

FIG. 7 is a more detailed view of the AVSRT 604 shown in FIG. 6. The AVSRT 604 may receive as an input the motion vector field from the previous motion vector cycle. As noted above, the motion vector field from the previous motion estimation cycle may be used to predict the likely motion vectors for the subsequent motion estimation cycle. The motion vector field from the previous cycle may be input into a vertical or "Y" histogram module 702. The vertical histogram module 702 is configured to receive the motion vector field and generate a histogram based on the projection of the motion vector field onto a vertical "Y" axis. The histogram may include a finite number of bins. In some embodiments, the number of bins in the histogram may be equal to the number of blocks contained inside REF frame, and each bin may hold the occurrence frequency of the value falling in that bin. FIG. 9A provides an example of a histogram 900 which is generated by the vertical histogram module 702 from FIG. 7. In the example provided in FIG. 9A, the histogram curve 902 traverses a vertical search range from [−16, 16], resulting in a total of 33 bins in the histogram as shown.

Figure 9B:
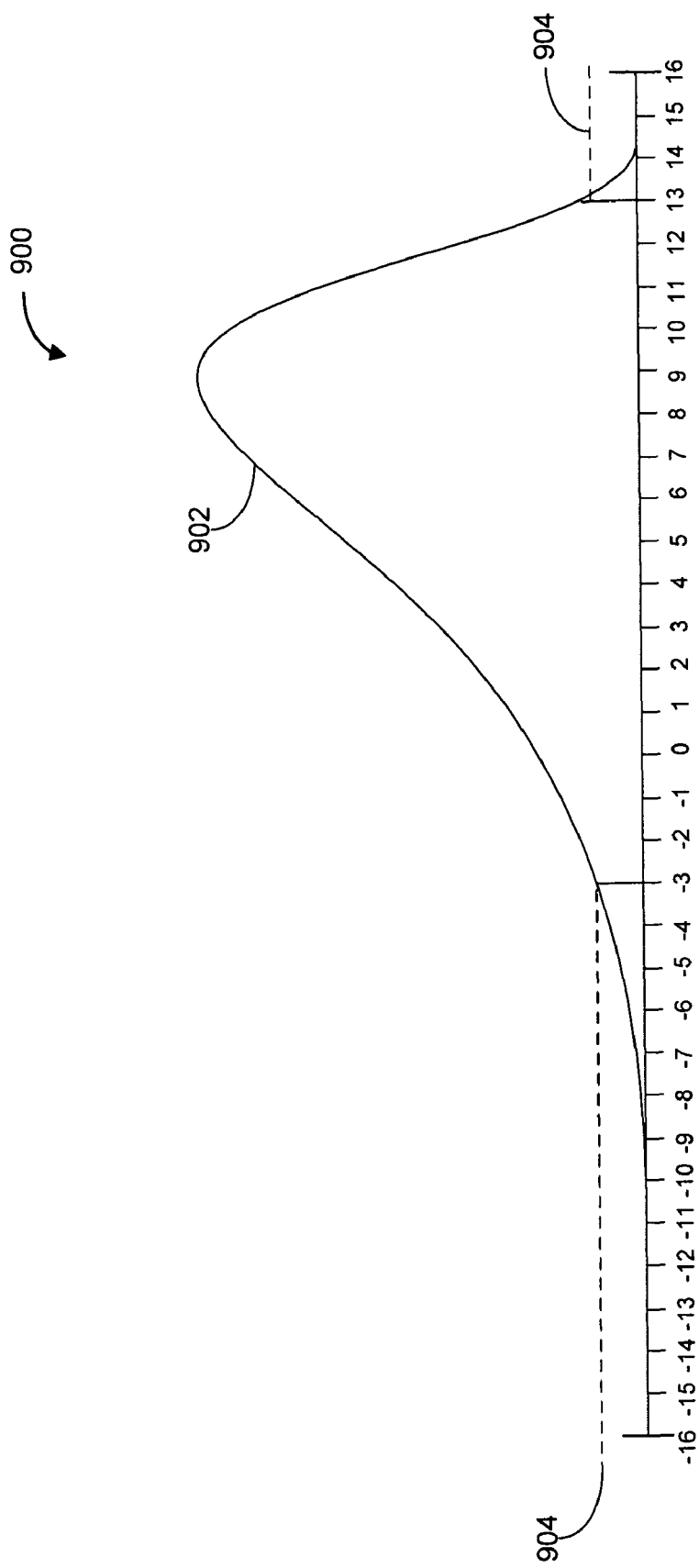
Figure 9C:
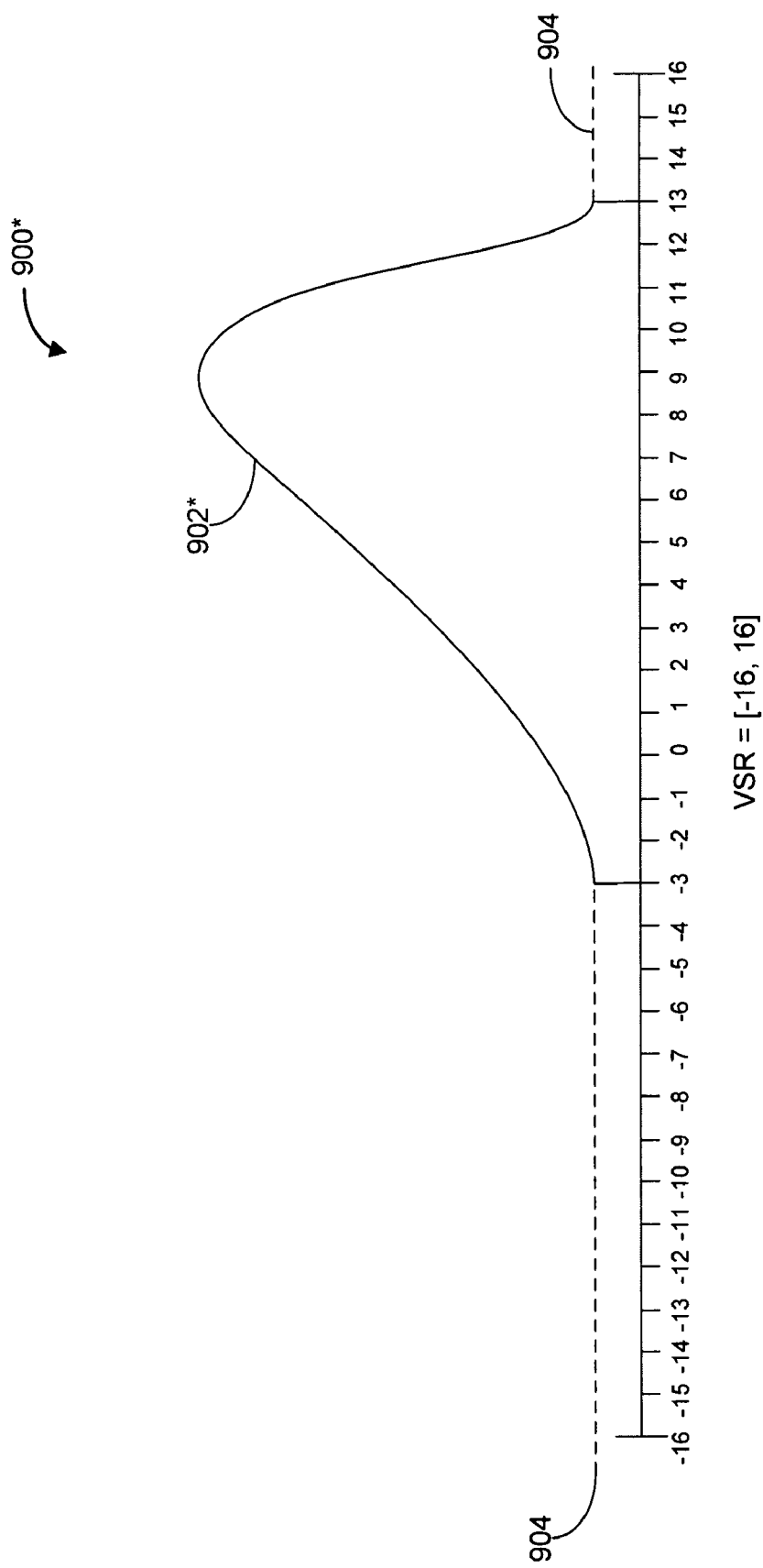

Referring back to FIG. 7, the histogram 900 generated by the vertical histogram module 702 may be provided to a coring module 704. The coring module 704 may be configured to perform a coring process on the histogram 900. The coring process is typically used to remove and/or eliminate spurious frequencies or other noise from the histogram 900. The coring module may receive as an input parameter a predetermined coring threshold. In some embodiments, the coring threshold may be expressed as a percentage of the area under the histogram 900. For example, the coring threshold may be set to be five percent (5%) of the total area under the histogram. With a coring threshold of 5%, any bin in the histogram 900 which has a frequency less than or equal to 5% of the total area under the curve will be suppressed to zero frequency. FIG. 9B shows an example of the histogram 900 with a coring threshold 904 applied. As shown, the applying the coring threshold 904 results in the bins for the vertical search range values of −16 through −4 being suppressed to zero on the left side of the histogram curve 902. Similarly, on the right side of the histogram curve 902, application of the coring threshold 904 results in the vertical search range values of 14 through 16 also being suppressed to zero. Once the coring has been applied to the histogram 900 be the coring module 704, a new cored histogram 900* may be generated. FIG. 9C provides an example of the cored histogram 900* with the spurious frequencies removed by the coring process. As shown, the cored histogram 900* includes a histogram curve 902* which reduces to zero at the vertical search range values of −3 and 13.

Returning again to FIG. 7, After the coring process has been completed, and the cored histogram 900* has been generated, the cored histogram 900* may then be provided to a vertical offset prediction module 706. The vertical offset prediction module 706 typically is configured to generate a predicted offset for the vertical search range. The predicted vertical offset is used to move the vertical search range for the next cycle of motion estimation to improve the ability of the motion estimation module 602 to account for, handle, and generated accurate motion vectors for large vertical panning movements in the processed video.

Figure 8:
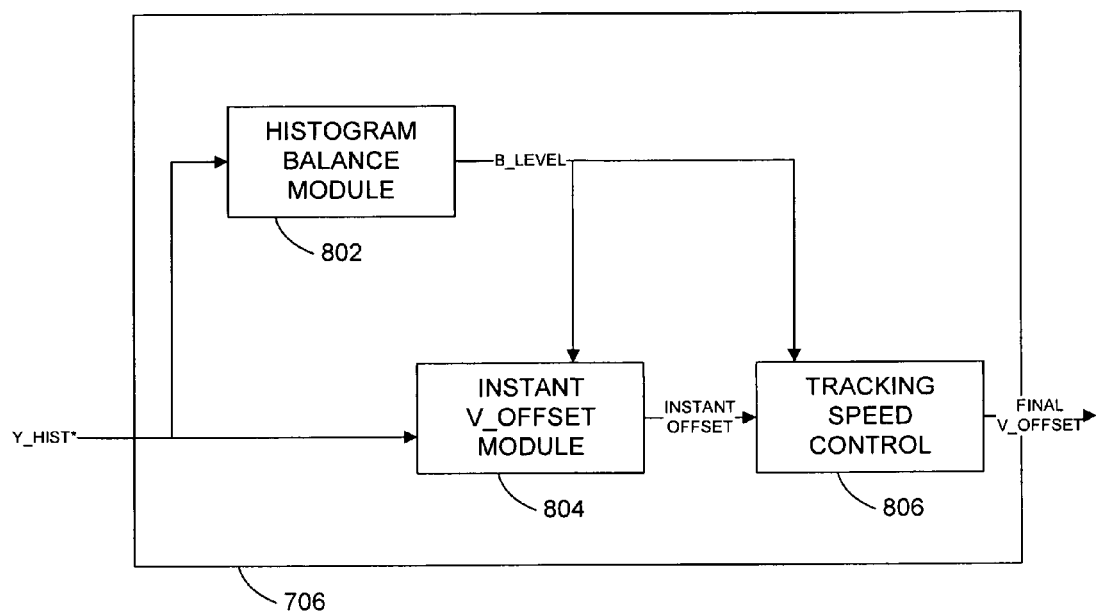
FIG. 8 is a more detailed view of the vertical offset prediction module shown in FIG. 7.

FIG. 8 is a more detailed view of the vertical offset prediction module 706. In the example provided, the vertical offset prediction module 706 includes three sub-modules: a histogram balancing module 802, an instant vertical offset module 804, and a tracking speed control module 806. In certain embodiments, these three sub-modules may be configured to cooperatively generate an offset for the vertical search range used in a subsequent cycle of motion estimation.

The histogram balancing module 802 receives the cored histogram 900* and determines a balance level for the cored histogram 900*. The balance level may be expressed in various ways, most typically as a percentage or a fraction. In one embodiment, the balance level may be close to zero when the histogram is extremely out of balance, while a balance level of close to 1 may be indicative of the cored histogram 900* being well-balanced.

Figure 9D:
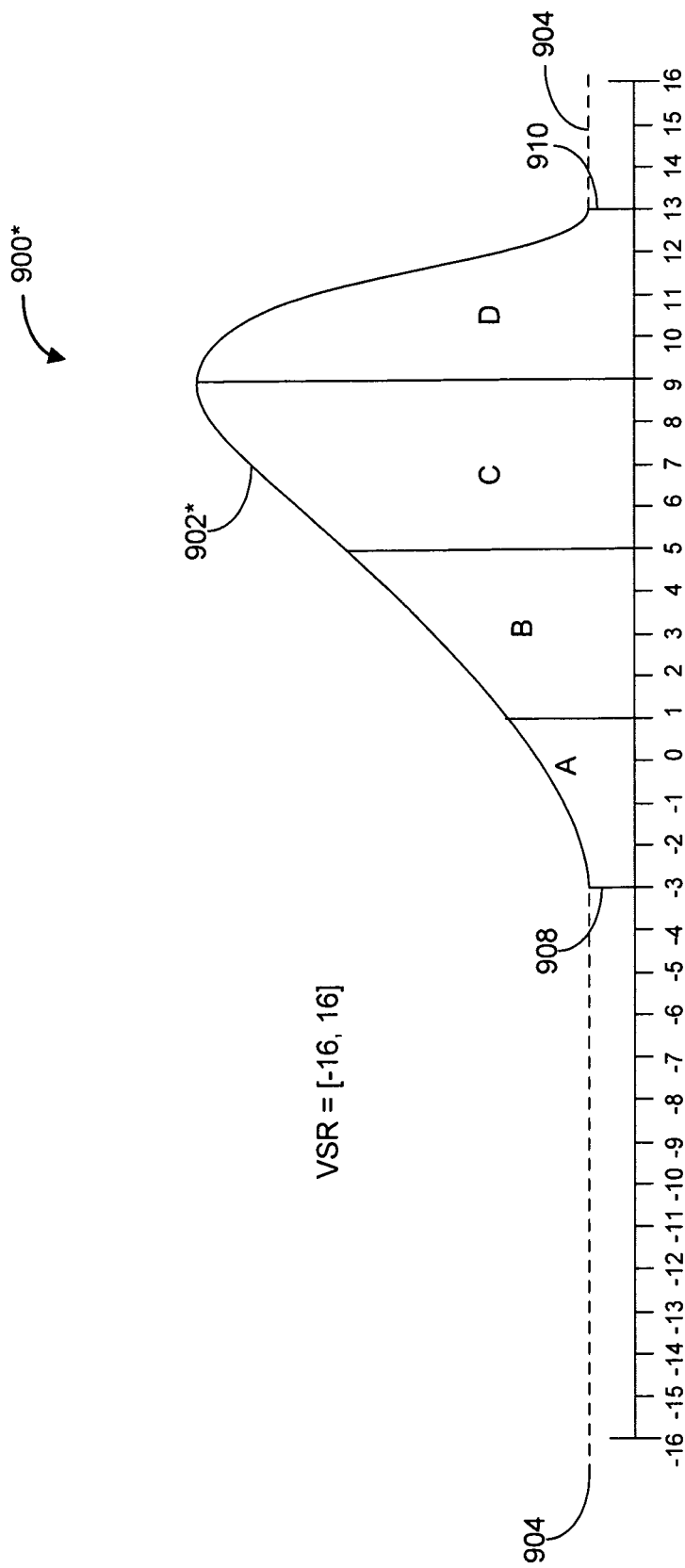

FIG. 9D provides an example of how the balance level may be derived from the cored histogram 900*. The cored histogram 900* may separated into partitions A-D. The partitions may be based on the vertical search range values such that the partitions are equidistant on the histogram horizontal axis as shown. The left-most partition A may begin at the left-most point 908 of the cored histogram 900*, while the right-most partition D may terminate at the right-most point 910. Although in this example there are four partitions which each include a range of 4 vertical search range values, a skilled artisan will appreciate that a different number partitions may be used and that the partition sizes may be allocated differently.

The areas under left and right partitions A and D may be determined and used to generate a balance level. In one embodiment, the balance level may be calculated based on the following equation:

$$\text{balanceLevel} = \min(A,D)/\max(A,D).$$

Utilizing the above equation, the balance level will range from 0.0 to 1.0 because the numerator of the fraction will always be less than or equal to the denominator. If the balance level is 0.0, the one of the areas A or D has an area of 0, which indicates that the cored histogram 900* is out of balance. If the balance level is around 1.0, the relative sizes of A and D are similar, which indicates that the cored histogram is well-balanced. In rare instances, both A and D may be 0.0. This exceptional case may be accounted for by setting the balance level to 0.0. In the example shown in FIG. 9D, the area A is much smaller than the area D. Thus, the balance level would be relatively low and closer to 0.0 than 1.0.

Referring back to FIG. 8, once the balance level has been determined by the histogram balance module 802, the calculated balance level may be provided to both the instant vertical offset module 804 and the tracking speed control module 806. The instant vertical offset module 804 may be configured to calculate an instantaneous vertical offset for the upcoming motion estimation cycle. The vertical offset module 804 may calculate an unbiased vertical offset value or a biased vertical offset value. Typically, an unbiased vertical offset may be suitable for estimating a motion vector where the movement is not sudden or dramatic, as the object is not likely be extended well beyond the default vertical search range. However, in cases of sudden vertical movement or camera panning motion, the unbiased offset may be inadequate. Thus, a biased vertical offset may also be determined by the vertical offset module 804 which may constitute a modified unbiased vertical plus an additional offset based at least in part on the balance level.

Figure 9E:
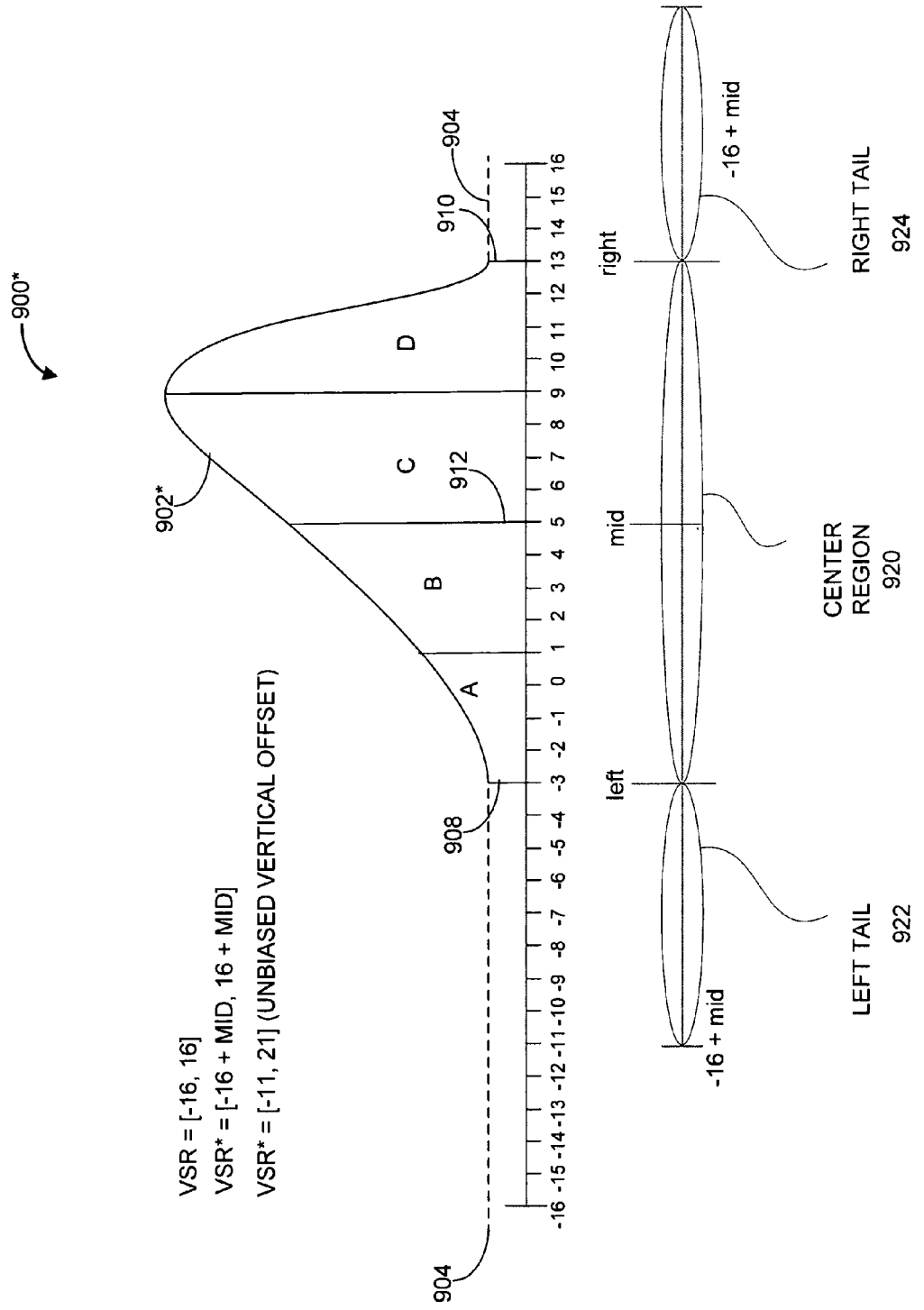

Referring now to FIG. 9E, an example of obtaining the instantaneous vertical offset value is provided. In this example, the unbiased offset is determined based on the middle point of the cored histogram, e.g., the middle point between the left-most point 908 and the right-most point 910. In this particular example, the cored histogram extends from −3 to 13 on the histogram horizontal axis. Thus, the middle point 912 between these two locations is the value of 5. Based on the offset value of 5, the vertical search range (initially set to [−16, 16]) may be shifted by the offset value to become an unbiased vertical offset search rang (identified as VSR* in the figure). The unbiased vertical offset search range VSR* is offset by 5 from [−16, 16] to [−11, 21] as shown.

The unbiased vertical offset search range VSR* includes a center region 920, which includes the range of the cored histogram 900*. The unbiased vertical offset search range VSR* also includes a left tail 922 and a right tail 924, respectively. The outer limits of the left and right tails 922, 924 are generally indicative of the outer limits of the motion vector range for the next motion estimation cycle. Because the left tail 922 and the right tail 924 are of equal length, the unbiased vertical offset search range VSR* is unbiased toward either smaller or larger motion vectors.

In certain instances, a video sequence may contain a series of frames in which a large amount of camera panning occurs in a vertical direction. In these instances, the cored histogram 900* will generally be highly unbalanced because the actual motion vector may fall outside of the current vertical search range. In order to improve object tracking in these instances, the unbiased vertical offset may be modified to be biased toward the larger areas of the cored histogram 900*. In some embodiments, a biased offset may be generated in order to better account for these large movements.

In one particular embodiment, a biased offset may be determined according to the following formula:

biased offset=unbiased offset±Δ, where Δ is the deviation amount and where $$|\Delta| \le \frac{1}{2}(\text{right} - \text{left}).$$

In some embodiments, deviation amount Δ may be calculated using the balance level determined by the histogram balance module 802. In one particular embodiment, the deviation amount Δ may be calculated as the product of one half the distance from the the left edge 908 to the right edge 910 of the cored histogram 900* and the amount the cored histogram 900* is off-balance:

$$\Delta = \frac{1}{2}(\text{right} - \text{left})(1.0 - \text{balance level}).$$

By basing the deviation amount on the balance level, if the core histogram 900* is well-balanced (e.g., the balance level is near 1.0), the deviation Δ will be also very small. In contrast, if the calculated balance level is highly unbalanced (e.g., near 0.0), the resultant deviation will be more significant, and could be as high as ½ the total vertical search range if the balance level is 0.0.

Once the instant vertical offset value has been determined (whether it be a biased instant offset value or an unbiased instant offset value), that value is provided to the tracking speed control module 806 as shown in FIG. 8. During each individual cycle of motion estimation, the instant vertical offset value is based on the pair of image frames that are under consideration. In some implementations of motion estimation, several cycles of motion estimation may take place between a reference and target frame. In cases of sudden vertical movement, using the a vertical search range based solely on the instant vertical offset value may result in a vertical offset value that is large and may result in too sudden of a transition from cycle to cycle. The tracking speed control module 806 may be used to smooth out these transitions by adaptively controlling the transition speed of the final vertical offset value based on the balance level determined by the histogram balance module 802.

Figure 10:
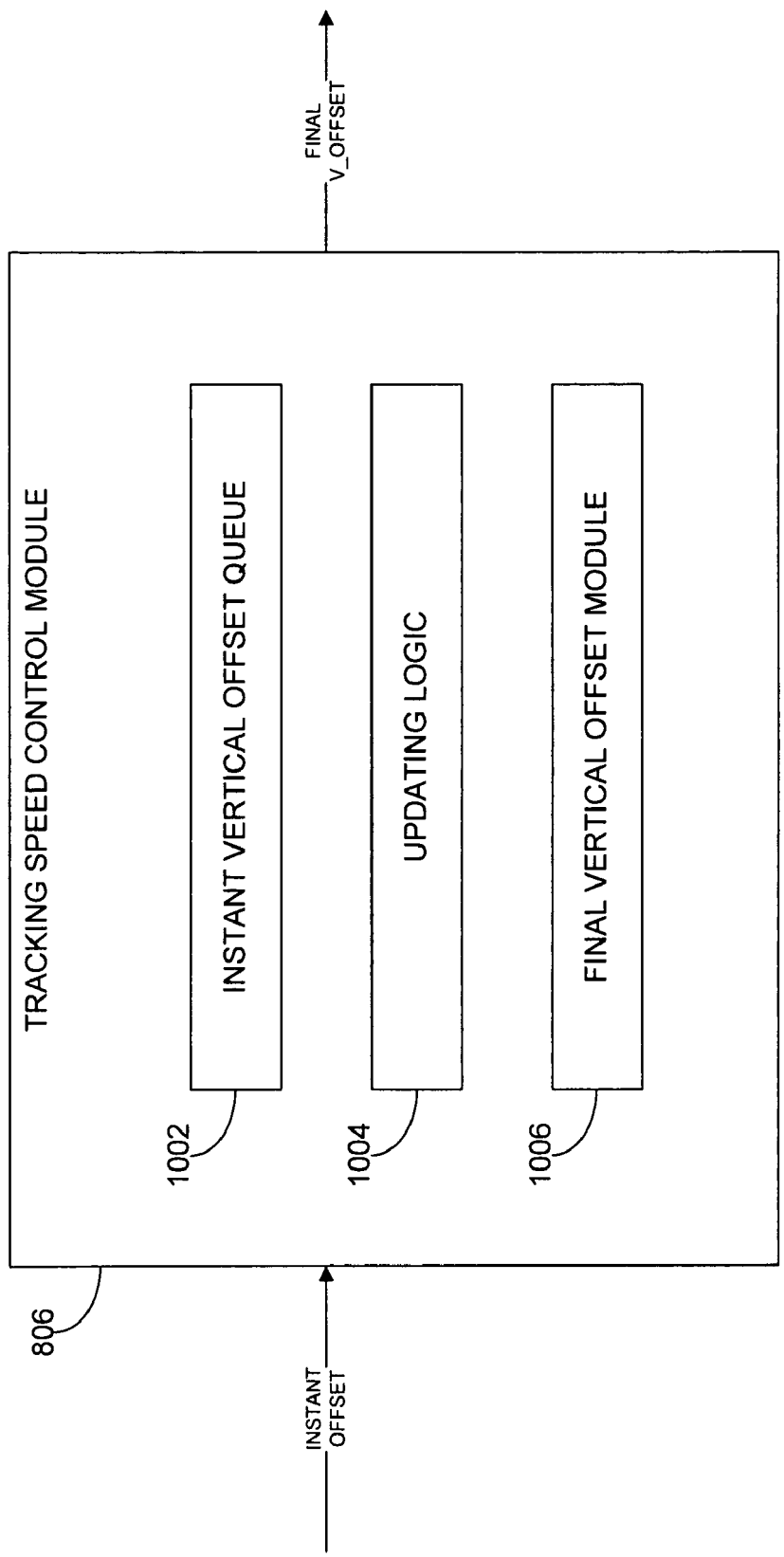
FIG. 10 is a more detailed view of the tracking speed module from FIG. 8.

FIG. 10 is a more detailed view of the tracking speed module 806. As shown, the tracking speed module 806 may include an instant vertical offset value queue 1002. The instant vertical offset value queue 1002 may be configured to store past instant vertical offset values from prior motion estimation cycles. The tracking speed module 806 may also include updating logic 1004. The updating logic 1004 may take the form of one or more functions which specify how instant vertical offset values are pushed into the queue 1002 and others are removed from the queue. The tracking speed module 806 may further include a final vertical offset module 1006. The final vertical offset module 1006 may include one or more functions which allow calculate the final vertical offset value to be used for the current motion estimation cycle.

Although the queue 1002 need not be any specific size, in one embodiment, the instant vertical offset value queue 1002 may store four values—the instant vertical offset values from the four most recent motion estimation cycles. These four values may be averaged to determine a final vertical offset value for the vertical search range. In certain embodiments, the tracking speed may be controlled by the updating logic 1004. The updating logic 1004 may be configured to push more instances of the instant vertical offset onto the queue based on the balance level. Where the balance level is low, indicating that the vertical panning motion is relatively large, more instances of the instant vertical offset may be pushed into the queue 1002. Thus, the average of the values in the queue is dominated by the instant vertical offset value for the current cycle, and is less influence by previous cycles. Alternatively, where the balance level is high, fewer instances of the vertical offset value are pushed onto the queue.

In some embodiments, the final vertical offset value may be limited to fall within certain ranges in order to prevent unreliable motion estimation when the absolute value of the final vertical offset becomes too large. In one particular example, where the queue 1002 holds four values [q0, q1, q2, q3], the final vertical offset value may be expressed according to the formula:

$$vOffset = \min\left(Offset_{max}, \max\left(Offset_{min}, \frac{1}{4}(q0+q1+q2+q3)\right)\right).$$

By using this formula, the final vertical offset value will never be greater than $Offset_{max}$, and will also never be less than $Offset_{min}$.

Figure 11:
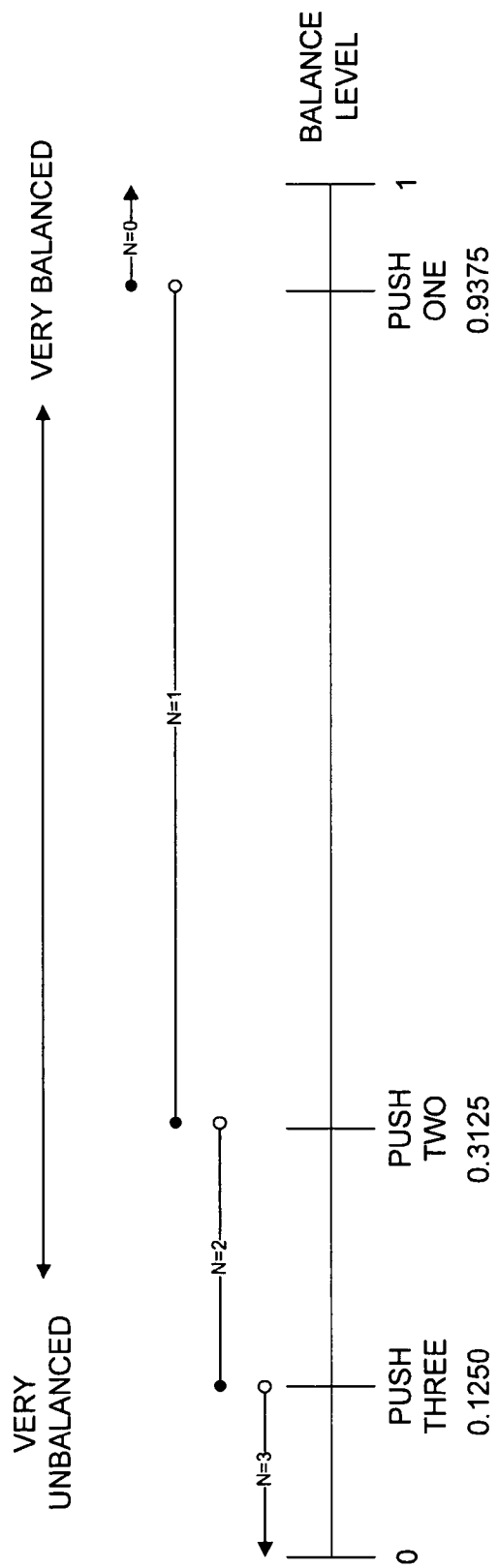
FIG. 11 is an illustration of the implementation updating logic shown in FIG. 10.

As noted above, the updating logic 1004 may be used to specify how instant vertical offset values are pushed into the queue 1002. By controlling the way that values are pushed into the queue 1002, the tracking speed may be adaptively controlled. FIG. 11 provides an illustration of one implementation of updating logic 1004. As shown, the number n of values pushed into the queue may be based on the balance level as determined by the histogram balance module 802. Where the cored histogram 900* is very well-balanced, with a balance level, for example, greater than or equal to 0.9375, the instant offset vertical search range value is not pushed onto the queue because the histogram is in balance. A balanced histogram indicates that the current vertical search range is appropriate for the current motion estimation cycle. If the cored histogram 900* is slightly out of balance, a single instance of instant vertical offset value may be pushed into the front of the queue 1002, thereby pushing out the last (oldest) value in the queue 1002. In the example shown in FIG. 11, n equals 1 if the balance level is less than 0.9375 but greater than or equal to 0.3125.

When the cored histogram 900* is more off-balanced, the number of instances of the instant offset pushed into the queue 1002 increases. If the balance level falls between 0.3125 and 0.1250, two instances of the instant offset value are pushed into the queue 1002. Finally, if the cored histogram 900* is very unbalanced, with a balance level less than 0.1250, three instances of the instant vertical offset value may be pushed into the queue so that the final vertical offset accounts for the fast panning motion indicated by the low balance level.

Figure 12:
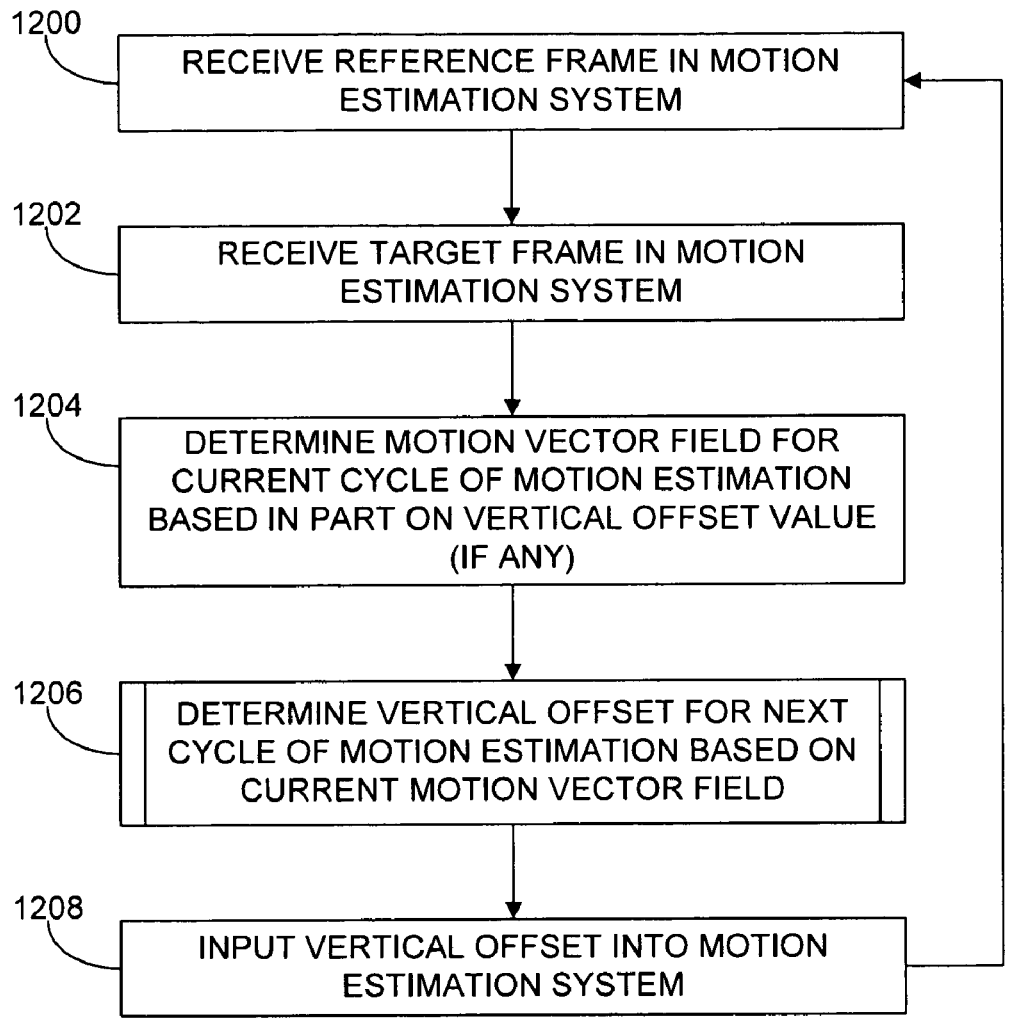
FIG. 12 is a flowchart of a process for performing motion estimation using an adaptive vertical search range.

FIG. 12 is a high-level flowchart which illustrates one example of a process for estimating a motion vector using an adaptive vertical search range in accordance with one or more embodiments. The process begins at block 1200, where a reference frame is received into a motion estimation system such as adaptive motion estimation subsystem 500. The process then moves to block 1202, where a target frame is also received into the motion estimation system. At block 1204, the motion vector field is determined for the current cycle of motion estimation. The motion vector field may be adjusted based at least in part on a vertical offset value, such as that generated by the AVSRT module 604 from FIG. 6, for example. The process then moves to block 1206, where the motion vector field from the current cycle is used to determine a vertical offset search range for the next cycle of motion estimation. As discussed above, in some embodiments, the motion vector field for the current motion estimation cycle may be provided to the AVSRT module 604. The AVSRT 604 in turn may then determine a vertical offset for the next cycle of motion estimation. Once the vertical offset has been determined, the process then moves to block 1208, where the vertical offset is input into the motion estimation system, e.g., the motion estimation module 602. Once the motion estimation system has received the vertical offset, the process returns to block 1200, where the next motion estimation cycle begins.

Figure 13:
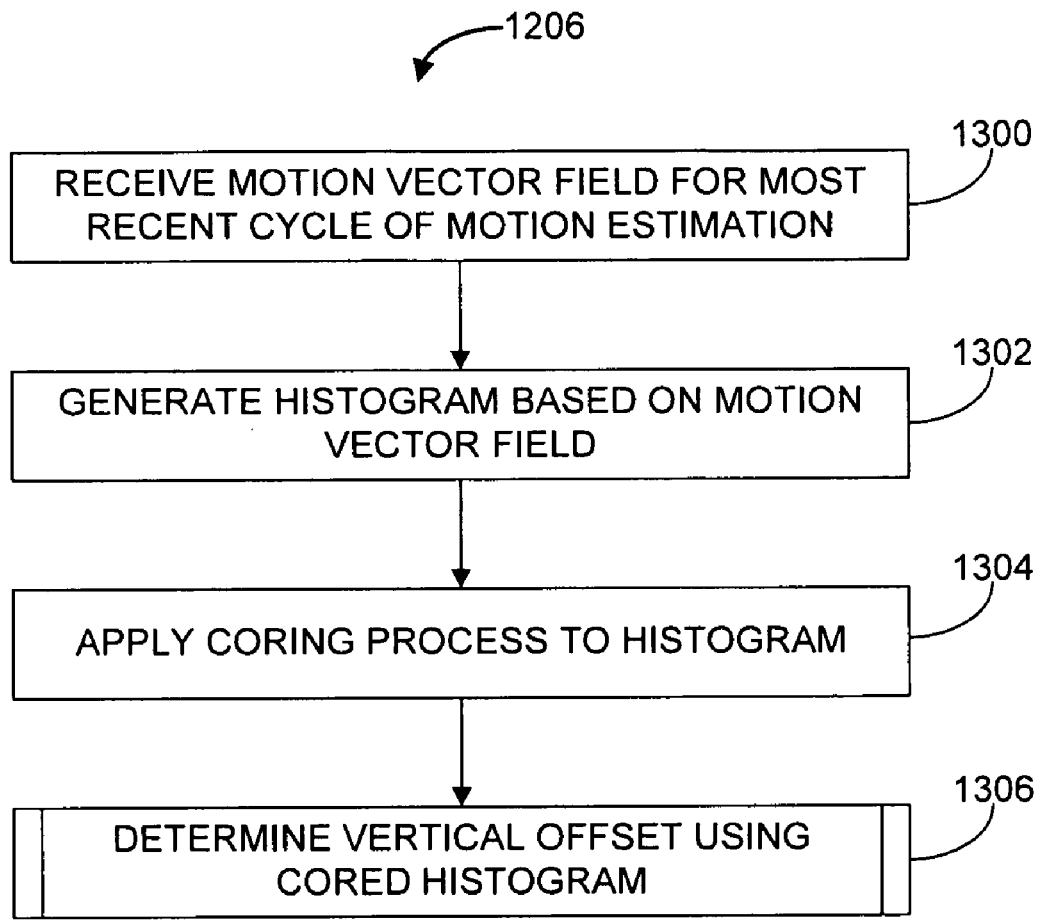
FIG. 13 is a more detailed flowchart illustrating how a vertical offset value for a subsequent cycle of motion estimation may be generated based on the current cycle of motion estimation.

FIG. 13 is a more detailed view of the process of determining a vertical offset for next cycle of motion estimation based on current motion vector field as set forth in block 1206. The process begins at block 1300, where the motion vector field for the most recent cycle of motion estimation is received. In some embodiments, the motion vector field may be received in the vertical histogram module 702 of the AVSRT 604. The process then moves to block 1302, where a histogram (such as histogram 900, for example) is generated based on the motion vector field received by the vertical histogram module 702. Next, a coring process is applied to the generated histogram 900, which results in a modified histogram such as cored histogram 900* discussed above in connection with FIGS. 9A-9C. Once the cored histogram has been generated, the process then moves to block 1306, where a vertical offset value is determined using the cored histogram 900*.

Figure 14:
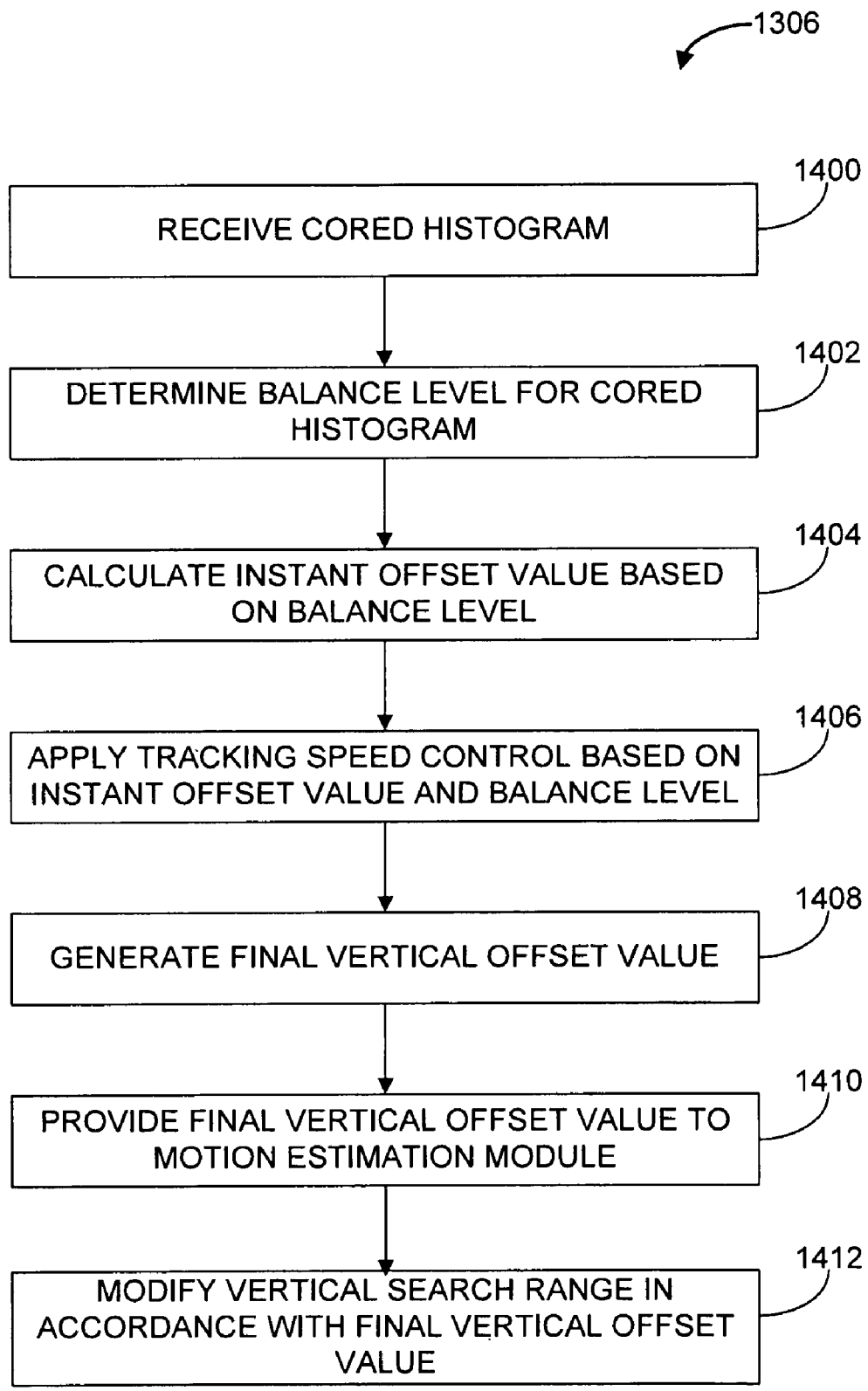
FIG. 14 is a flowchart of the vertical offset determination process from FIG. 13.

FIG. 14 is a flowchart of the vertical offset determination process from block 1306. The process begins at block 1400, where the cored histogram 900* is received by the vertical offset prediction module 706. Next, the process moves to block 1402, where the balance level for the cored histogram 900* is determined. As noted above, in certain embodiments, the balance level may be determined using a histogram balance module 802. The process then continues to block 1404, where the instant offset value for the current motion estimation cycle is calculated. As noted previously, the calculation may be performed by the instant vertical offset module 804. Once the instant offset value has been calculated, the process then moves to block 1406, where tracking speed control is applied to the instant offset using the balance level calculated by the histogram balancing module 802. The tracking speed control process may be performed by the tracking speed control module 806. At block 1408, a final vertical offset value is generated. As discussed above, the final vertical offset value may be based on the average value of the data queue 1002, which may include one or more instances of the instant vertical offset value. Once the final vertical offset value has been determined, it may be provided to the motion estimation module 602 at bock 1410. Then, at block 1412, the motion estimation module 602 may then modify its vertical search range in accordance with the final vertical offset value and perform the current cycle of motion estimation.

In view of the embodiments described above, a system and method of providing motion estimation using an adaptive vertical search range are disclosed which allow for a reduced hardware implementation cost by improving motion estimation capability without the use of additional line memory. It will be understood by those of skill in the art that numerous and various modifications can be made without departing from the spirit of the present invention.

What is claimed is:

1. A motion estimation system for a display device, the system comprising:
    a processor having a data storage;
    an adaptive vertical search range tracking (AVSRT) module executed by the processor, the AVSRT configured to generate a vertical offset value for a vertical search range associated with a motion estimation cycle; and
    a motion estimation module executed by the processor, the motion estimation module configured to receive the vertical offset value and estimate a motion vector for a reference video frame and a target video frame with a vertical search range based at least in part on the vertical offset value.

2. The system of claim 1, wherein the AVSRT module further comprises a histogram module configured to receive a motion vector field from a prior cycle of motion estimation and generate a histogram based on the received motion vector field, wherein the vertical offset value is based at least in part on the generated histogram.

3. The system of claim 2, wherein the histogram module is configured to provide the generated histogram to a coring module, and wherein the coring module is configured to perform a coring process on the histogram resulting in a cored histogram.

4. The system of claim 3, wherein the coring process uses a predefined coring threshold.

5. The system of claim 4, wherein the coring threshold is about five percent.

6. The system of claim 3, wherein the coring module is further configured to provide the cored histogram to a vertical offset prediction module, and wherein the vertical offset prediction module is configured to generate the vertical offset value based at least in part on the cored histogram.

7. The system of claim 6, wherein the vertical offset prediction module comprises:

a histogram balancing module configured to determine a balance level of the cored histogram, wherein the vertical offset value is further based at least in part on the balance level of the cored histogram.

8. The system of claim 7, wherein the vertical offset prediction module further comprises an instant vertical offset module configured to determine an instant vertical offset value based on the cored histogram.

9. The system of claim 8, wherein the instant vertical offset value is a biased offset value.

10. The system of claim 8, wherein the vertical offset prediction module further comprises a tracking speed control module configured to:

receive the balance level from the histogram balancing module and the instant offset from the instant vertical offset module;

push one or more instances of the instant vertical offset value into a data queue and remove a corresponding number of instances of the instant offset value from the data queue; and set the vertical offset value based on the values in the data queue.

* * * * *